United States Patent
Toro (10) Patent No.: US 8,703,348 B2
(45) Date of Patent: Apr. 22, 2014

(54) FULL CELL COOLING DEVICE INCLUDING POROUS ELEMENT HAVING PREDETERMINED PATH FOR A COOLANT FLOW

(75) Inventor: Antonino Toro, Segrate (IT)

(73) Assignee: Nuvera Fuel Cells Europe SRL, S. Donato, Milanese (IT)

( * ) Notice: Subject to any disclaimer, the term of this patent is extended or adjusted under 35 U.S.C. 154(b) by 996 days.

(21) Appl. No.: 11/659,289

(22) PCT Filed: Jun. 28, 2005

(86) PCT No.: PCT/EP2005/006951
§ 371 (c)(1),
(2), (4) Date: Nov. 20, 2007

(87) PCT Pub. No.: WO2006/002871
PCT Pub. Date: Jan. 12, 2006

(65) Prior Publication Data
US 2008/0305374 A1    Dec. 11, 2008

(30) Foreign Application Priority Data
Jun. 30, 2004 (IT) .............................. MI2004A1314

(51) Int. Cl.
*H01M 2/02* (2006.01)
*H01M 8/04* (2006.01)

(52) U.S. Cl.
USPC ........... 429/435; 429/433; 429/434; 429/512; 429/535

(58) Field of Classification Search
USPC .................. 429/26, 433, 434, 435, 512, 535
See application file for complete search history.

(56) References Cited

U.S. PATENT DOCUMENTS

| | | | |
|---|---|---|---|
| 4,324,844 A * | 4/1982 | Kothmann | 429/434 |
| 5,922,458 A | 7/1999 | Herlihy | |
| 6,171,720 B1 | 1/2001 | Besmann | |
| 6,322,915 B1 | 11/2001 | Collins | |
| 2002/0114990 A1* | 8/2002 | Fly et al. | 429/44 |
| 2004/0170880 A1* | 9/2004 | Nagoshi et al. | 429/34 |

FOREIGN PATENT DOCUMENTS

| | | |
|---|---|---|
| DE | 101 59 007 A1 | 6/2003 |
| EP | 0 074 701 A | 3/1983 |
| EP | 1 154 504 A | 11/2001 |
| JP | 61-22572 | 1/1986 |
| WO | WO 03/034530 A2 | 4/2003 |

OTHER PUBLICATIONS

Delimit. Dictionary.com. Dictionary.com Unabridged. Random House, Inc. http://dictionary.reference.com/browse/delimit (accessed: Aug. 31, 2010).*

\* cited by examiner

*Primary Examiner* — Sean P Cullen
(74) *Attorney, Agent, or Firm* — Finnegan, Henderson, Farabow, Garrett & Dunner, LLP (57) ABSTRACT

The cooling device of the present invention is intercalated to the fuel cells assembled in a stack and comprises a planar, elastically deformable, conductive and porous element capable of ensuring both the passage of a suitable coolant and the electrical continuity between the walls delimiting the same. The planar conductive deformable and porous element is characterized by being provided with linear sections capable of guiding the coolant flow so as to reliably achieve a uniform heat withdrawal. The linear sections may have a straight shape and consist of inert impervious and preferably elastic material.

17 Claims, 7 Drawing Sheets

FULL CELL COOLING DEVICE INCLUDING POROUS ELEMENT HAVING PREDETERMINED PATH FOR A COOLANT FLOW

This application is a 371 of PCT/EP2005/006951 filed Jun. 28, 2005.

FIELD OF THE INVENTION

The invention is relative to a cooling device for membrane fuel cell stacks.

BACKGROUND OF THE INVENTION

Fuel cells are long-time known devices for the direct conversion of the chemical energy of combination of a fuel such as hydrogen and an oxidant such as air into electrical energy. Fuel cells are hence not subject to the known limitation of Carnot's cycle and are therefore characterised by a particularly high efficiency compared to the conventional devices for the production of electrical energy wherein an intermediate thermal step is present.

Among the several known types, the ion-exchange membrane fuel cell has gained a special attention for its capacity in responding to quick power demands and for the simplicity of the required auxiliaries, particularly in automotive applications and for the generation of small stationary power for domestic uses or for small communities.

The membrane fuel cell (hereafter defined in short with the acronym PEMFC from Proton Exchange Membrane Fuel Cell) consists of an electrochemical unit comprising an ionomeric membrane, either of the perfluorinated type as known in the art and as commercialised for instance by DuPont, USA under the trademark Nafion® or of the hydrocarbon type based on monomers deriving from polymeric structures such as polystyrene, polyetheretherketones and the like, on whose faces are applied two electrodes, anode and cathode, in form of porous films containing suitable catalysts (the membrane-electrode electrochemical unit is hereafter defined with the acronym CCM from Catalyst-Coated Membrane). The electrode outer surfaces are in contact in their turn with porous conductive layers, known as diffusion layers, suited to establish a homogeneous distribution of reactants, for instance hydrogen and air. The overall assembly resulting from the CCM associated to the diffusion layers (hereafter defined by the acronym MEA from Membrane-Electrode Assembly) is inserted between two planar and conductive structures provided with a higher porosity than the diffusion layers, directed to ensure both the uniform distribution of electric current and the reactant supply to the diffusion layers: such structures are known in the art as collectors. The MEA and the relevant collectors, together with suitable sealing gaskets, are finally enclosed between a pair of bipolar plates, consisting of two suitably shaped sheets, impervious to the reactants and electrically conductive. The fuel and the oxidant are supplied through openings obtained in the bipolar plates and are respectively distributed to the anode and the cathode through the collectors and the relative diffusion layers. The fuel, for example hydrogen; is oxidised with generation of protons and electrons. Protons migrate across the ionomeric membrane participating to the reduction of the oxygen contained in the air with formation of water. The electrons required for the oxygen reduction reaction come from the anode through the external electrical load circuit. The conversion efficiency of the chemical energy of reaction into electrical energy, although substantially higher than that of conventional generators, is largely below 100%: the portion of chemical energy not converted to electrical energy is dissipated as thermal energy which must be extracted by a suitable cooling device to maintain the internal PEMFC temperature typically around 60-100° C. The cooling device is preferably of forced-air type for small power systems, and of demineralised water or diathermic fluid (hereafter generally indicated as coolant) circulation type for higher power systems, which require the highest possible compactness. In the latter case, the cooling is normally effected by making the coolant flow along at least one of the bipolar plates. Since the electrical voltage of a single PEMFC under load is modest, of the order of 0.74-0.8 volts, the high voltages normally required by the load systems are obtained by assembling a multiplicity of single PEMFC intercalated to the cooling devices in blocks (hereafter stacks, as commonly known in the art).

Figure 1:
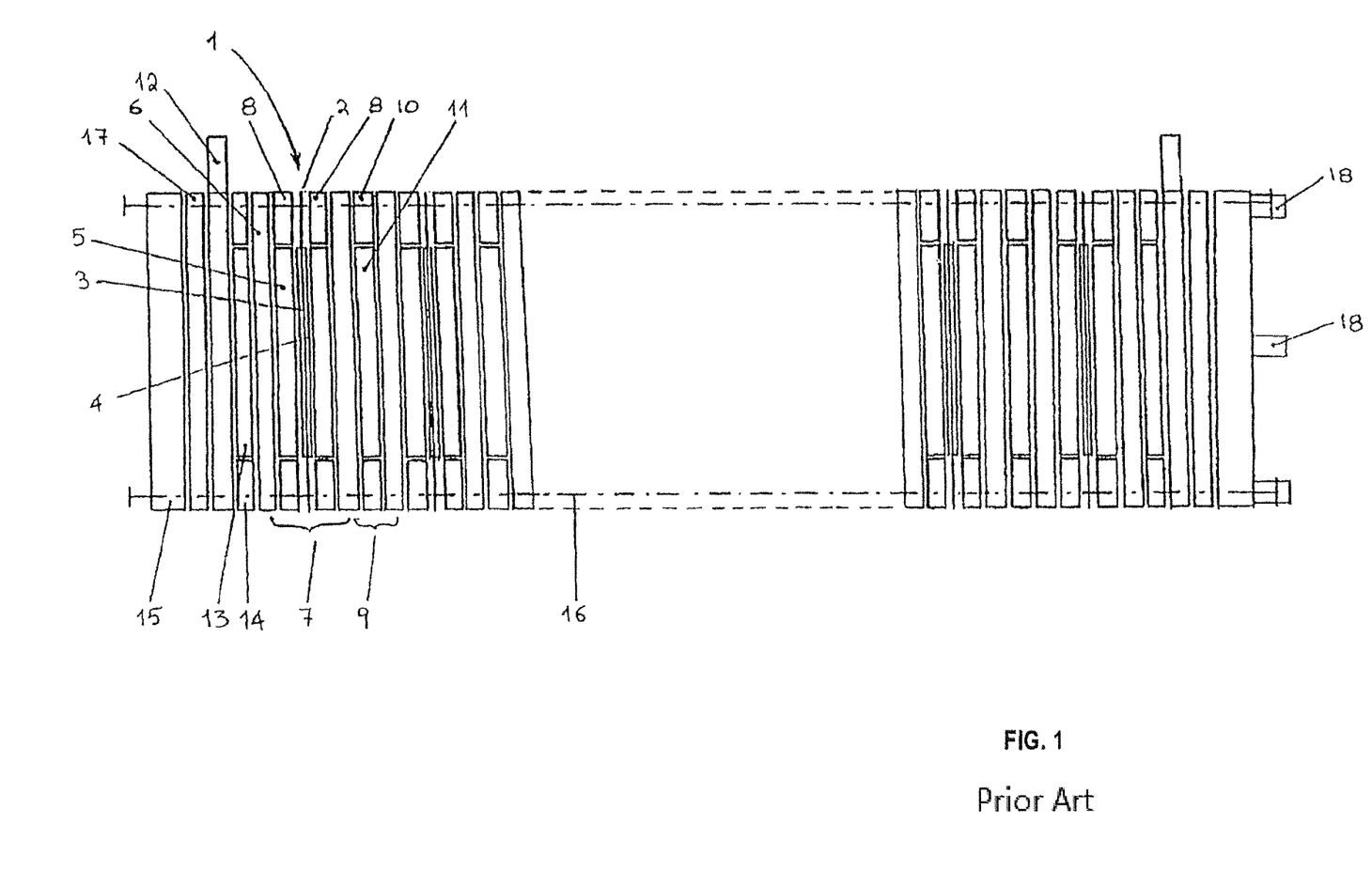
FIG. 1, sketch of a longitudinal section of a possible stack embodiment, comprising a mulplicity of fuel cells and of cooling devices intercalated therebetween.

FIG. 1 represents a longitudinal section of a possible embodiment of PEMFC stack according to the prior art disclosed in Italian Patent Application MI2003A001972, wherein (1) identifies the MEA assemblies each containing the diffusion layers, and the CCM units (7) consisting of the ionomeric membranes (2), the anodes (3) and the cathodes (4) in form of thin porous films containing the catalysts in contact with the membrane faces, the collectors (5), the bipolar plates n, peripherally sealed by gaskets (8), the cooling devices (9) each supplied with coolant and delimited by two adjacent bipolar plates (6), peripherally sealed by gaskets (10) and containing a planar conductive porous elastic element (11) which maintains the longitudinal electrical continuity. The stack furthermore comprises two plaques (12) of electrically conductive material for connecting the stack to the external electrical load circuit, each in contact with the terminal bipolar plates through a conductive element (13) equivalent to elements (11) and peripherally sealed by a gasket (14), two endplates (15) of low flexibility keeping the multiplicity of fuel cells and cooling devices under compression, ensuring a low electrical contact resistance by means of tie-rods (16) optionally provided with springs (not shown in the figure) for compensating the thermal dilatations/contractions of the various components. The tie-rods (16) are distributed in a suitable number along the perimeters of plates (15), bipolar plates (6), plaques (12) and gaskets (8), (10) and (14). The stack finally includes a sheet (17) of non conductive material for the electrical insulation of plates (15) from the stack, and connections (18), located on one of the two plates (15) to put the stack in communication with the external circuits for feeding the gaseous fuel and oxidant, for instance hydrogen and air. for withdrawing the exhausts and product water, and for the injection and extraction of the coolant. The fuel and the oxidant are respectively fed to the anodes and the cathodes by means of distributing channels obtained for example in the thickness of the gaskets (8) and connected to longitudinal manifolds fanned in the stack by lamination of suitable openings made in the different components. The injection of the coolant into the devices (9) and the discharge thereof, as well as the extraction of the mixture of exhausts and product water are carried out likewise. A critical element characterizing this and other types of stack and cooling device embodiments as described in the prior art is in the poor homogeneity of heat extraction from the fuel cell active surface, particularly in the conditions of higher electrical power output. In fact, in case of insufficient heat extraction even just from part of the active surface, the consequent temperature rise, albeit localized, causes a progressive membrane dehydration which leads to the downfall of proton conductivity with consequent worsening of performances.

DESCRIPTION OF THE INVENTION

The present invention is directed to solve the problems of the above cited cooling homogeneity of the fuel cells of the prior art by means of a modification of the porous planar element included in the cooling device.

In particular, in a first embodiment of the invention the porous planar element is provided with linear sections of material impervious to the fluid passage disposed so as to guide the coolant along predetermined paths.

In a second embodiment the linear sections of impervious material are shaped as straight segments.

In a third embodiment the cooling water or diathermic fluid-guiding linear sections are equally spaced between each other and are homogenously distributed over the surface of the planar porous element.

In a fourth embodiment the linear section are differently spaced between each other and are distributed in a inhomogeneous fashion over the surface of the planar porous element.

In a fifth embodiment the linear guiding sections are disposed so that only part of the surface of the porous planar element is concerned by the flow of the coolant. In a sixth embodiment the impervious material of the linear guiding sections is a resilient material.

In a seventh embodiment the linear sections of impervious and resilient material are applied to the porous element as liquid, consisting of a monomer or mixture of co-monomers or of an oligomer, which is subjected to a subsequent polymerisation under the action of a chemical initiator or of atmospheric oxygen or by irradiation with a suitable radiation source as known in the art. In a last embodiment the impervious material of the linear guiding sections consists of a very stiff material introduced within the thickness of the planar porous element.

BRIEF DESCRIPTION OF THE DRAWINGS

The invention will be better described with the support of drawings as indicated hereafter.

DETAILED DESCRIPTION OF THE DRAWINGS

Figure 2:
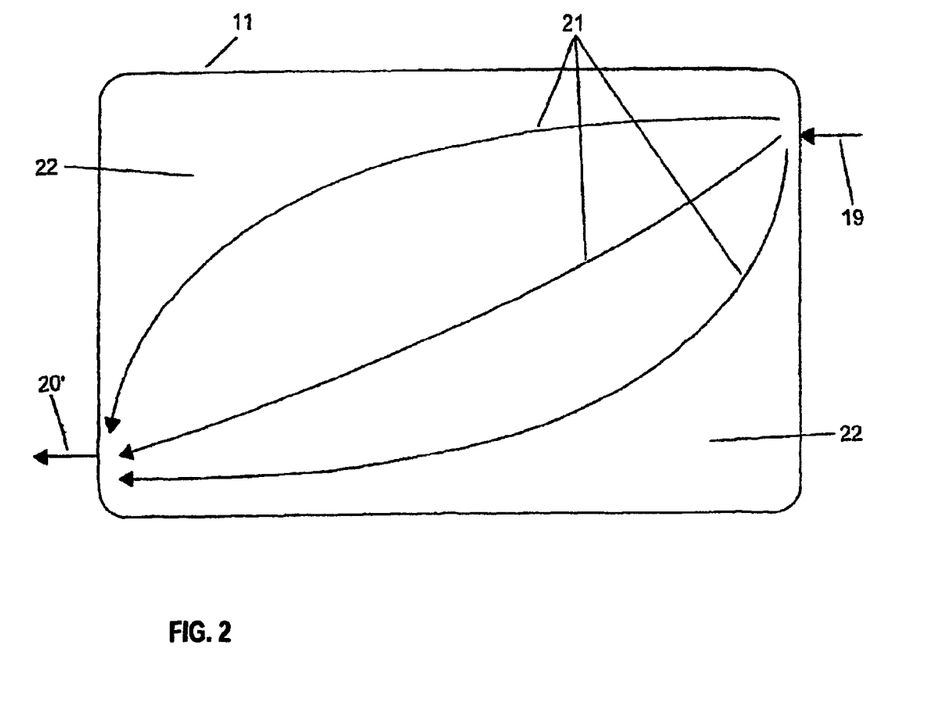
FIG. 2, simplified front-view of a porous planar element of a cooling device in a particularly simple prior art embodiment, provided with a single coolant inlet and a single coolant outlet located at the extremities of a diagonal. The flow distribution is indicated by arrows, as in the following figures.

FIG. 2 represents a simplified front-view of the conductive porous and elastic planar element (11) of the prior art inserted in each cooling device, which in a simpler embodiment is provided with a single Inlet (19) and a single outlet (20') approximately disposed at the extremities of a diagonal: the arrows (21) indicate the flow distribution of the cooling water or of the diathermic fluid as can be determined by appropriate hydrodynamic models making use of coloured liquids as tracers. The arrows clearly show that there exist areas (22) with practically stagnant flow wherein the cooling efficiency is seriously compromised. In the areas (22) therefore the local temperature of adjacent fuel cells may increase up to values incompatible with the correct operation of the membranes, which are subject to progressive dehydration and consequent loss of the required proton conductivity.

Figure 3:
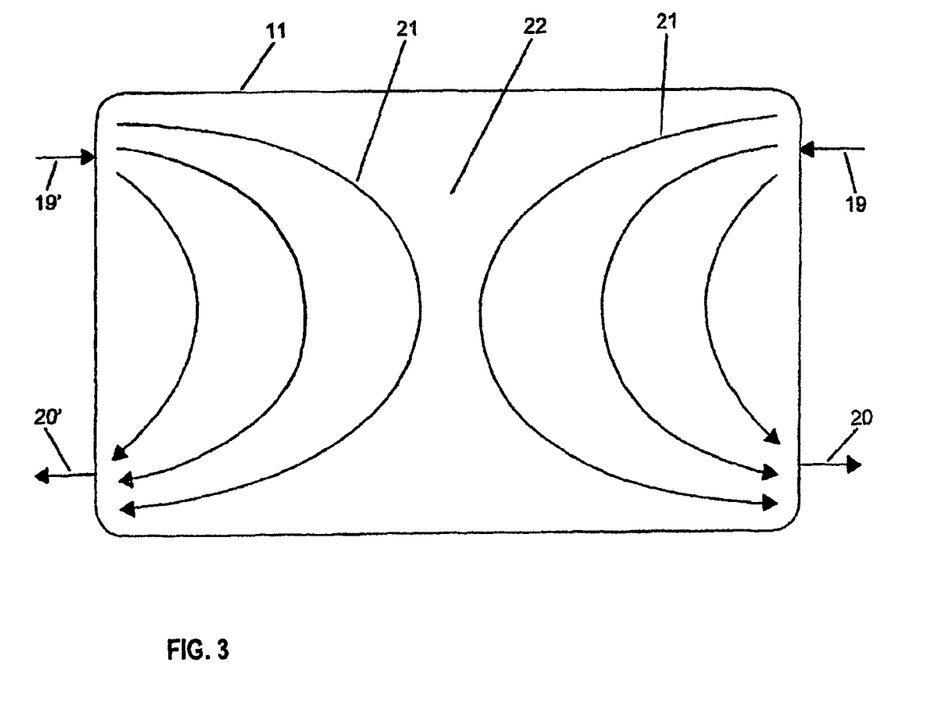
FIG. 3, simplified front-view of a porous planar element in a prior art embodiment of more complex constructional design characterised by the presence of two coolant inlets and outlets located at the extremities of the two diagonals.

FIG. 3 shows another more complex embodiment of coolant distribution of the prior art: in this case the cooling device is provided with two inlets (19, 19') and two outlets (20, 20') located at the extremities of the two diagonals. This embodiment, which implies a certain constructional complication, certainly improves the withdrawal of the heat generated by fuel cell operation, without achieving however a complete homogeneity: the study carried out on hydrodynamic models indicates in fact that there still exist areas (22), albeit less extensive than those of the embodiment of FIG. 2, of modest circulation, or even stagnation, of the coolant. Also in this figure the flow distribution is indicated by arrows (21).

Figure 4:
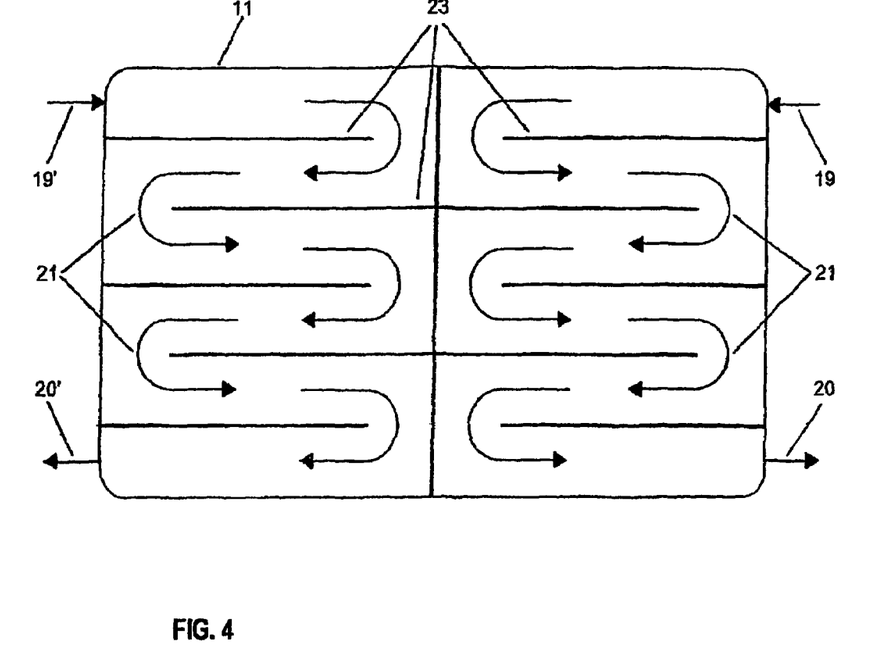
FIG. 4, simplified front-view of a porous planar element provided with linear guiding sections in accordance with the invention and provided with two coolant inlets and outlets located at the extremities of the two diagonals.

FIG. 4 shows a first embodiment of the invention directed to overcome the problem of the uncontrolled inhomogeneity of heat withdrawal in fuel cells: in particular, the planar porous element of the cooling device is provided with linear sections (23) allowing to guide the coolant flow in a predetermined fashion. Arrows (21) summarise the result of studies on the fluid distribution carried out on hydrodynamic models which permitted to substantially exclude the presence of macroscopic stagnation areas.

Figure 5:
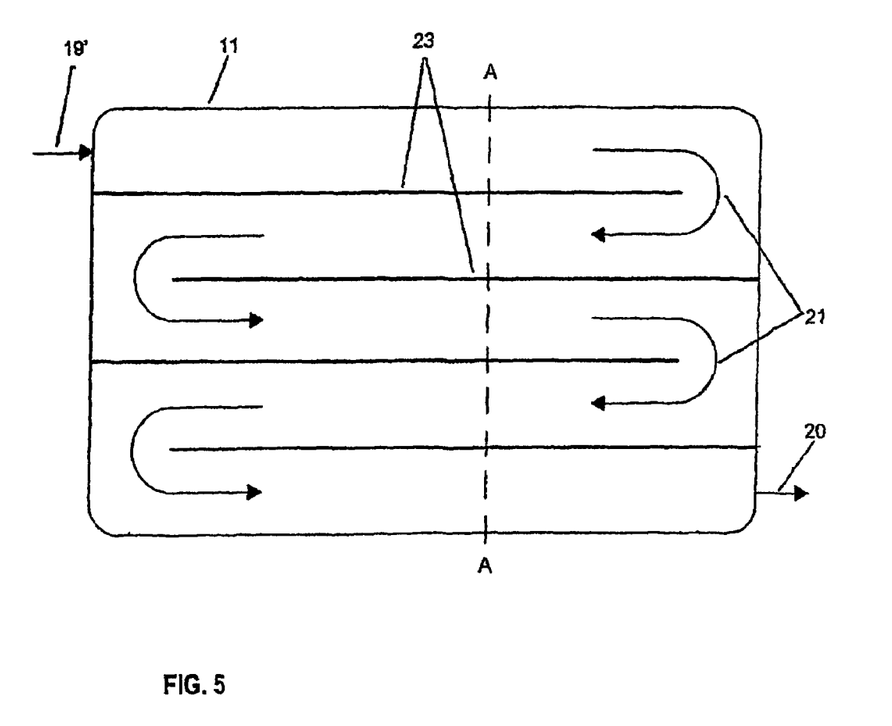
FIG. 5, simplified front-view of a further embodiment of the linear sections in accordance with the invention wherein the porous planar element is provided with a single coolant inlet and a single coolant outlet located at the extremities of a diagonal.

FIG. 5 is a sketch of a further embodiment of the invention useful in case of cooling devices provided with a single inlet (19') and a single outlet (20) located at the extremities of a diagonal: the reference numerals are the same of FIG. 4 for corresponding elements.

Figure 6:
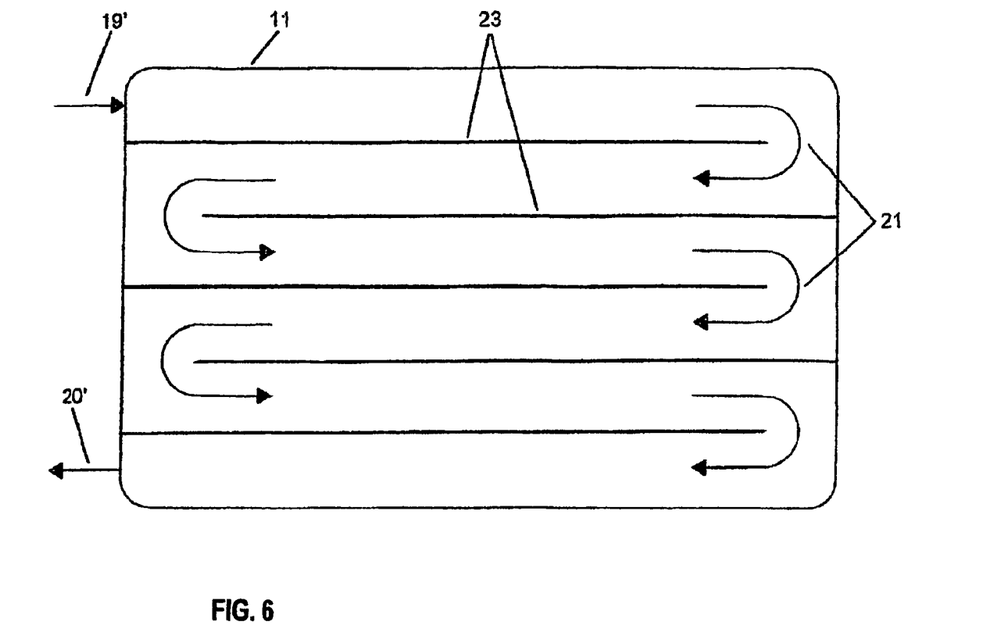
FIG. 6, simplified front-view of a modification of the porous planar element of FIG. 5, wherein the single coolant inlet and outlet are located at the opposite extremities of the same side.

FIG. 6 shows a modification of the planar element of FIG. 5 directed to allow its installation in cooling devices wherein the single inlet (19') and the single outlet (29) are located on the same side.

Figure 7:
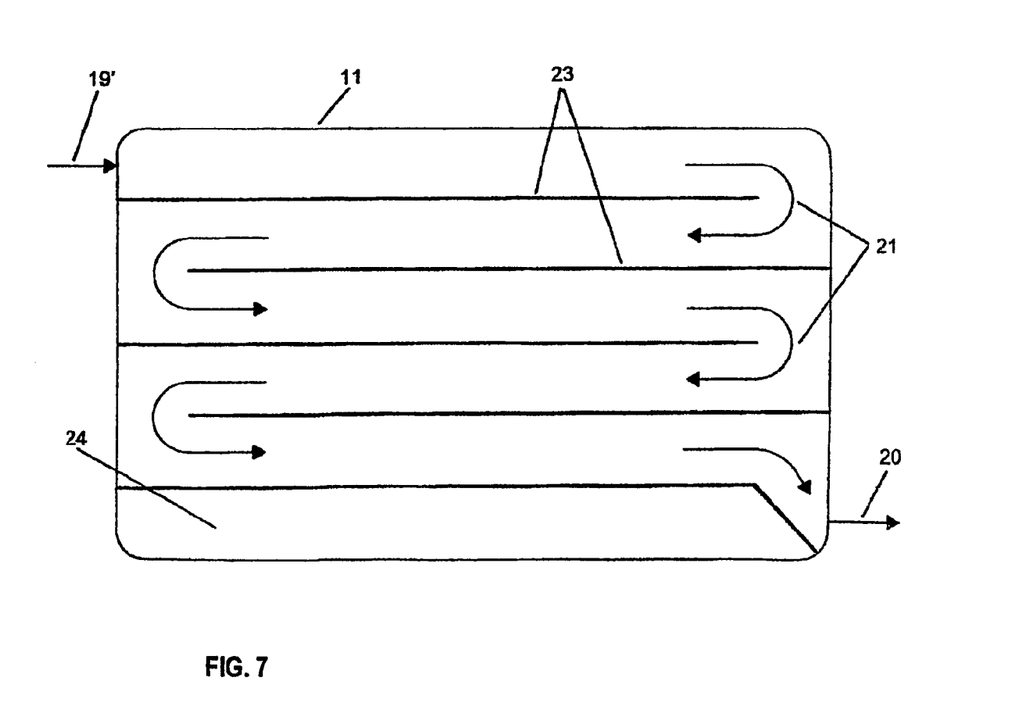
FIG. 7, simplified front-view of a further modification of the porous planar element of FIG. 5, wherein part of the lower portion of the surface is not concerned by the flow of the coolant.

The previous embodiments show how the invention can be easily practiced with different types of cooling device design. Such adaptability also allows to realise porous planar elements as shown in FIG. 7, wherein a predetermined part (24) of the surface is not accessible to the coolant flow. The aim of this embodiment is establishing a region of higher predetermined temperature in the adjacent fuel cells, which may be very profitable if such region is in correspondence with the very moist exhaust air discharge: a suitable increase of temperature in this region helps preventing the condensation of water with the consequent problems of electrode flooding and outlet manifold clogging. On the other hand the temperature Increase is strictly controlled by appropriately dimensioning the region of porous planar element not crossed by the water, so that a condition of membrane dehydration is assuredly not reached.

Figure 8:
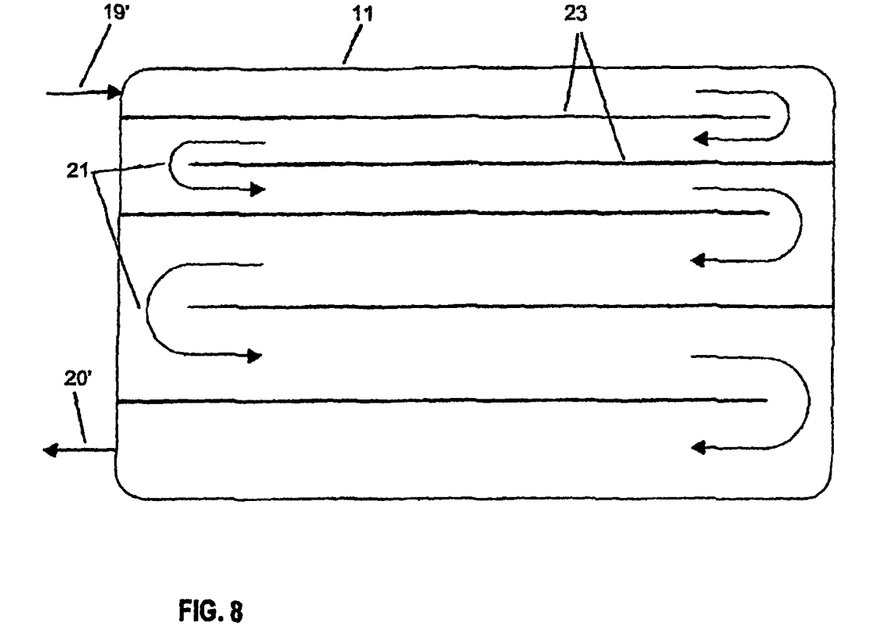
FIG. 8, simplified front-view of a further embodiment of the porous planar element of FIG. 6 in which the linear guiding sections are differently spaced in the various portions of the surface.

At any rate, an equivalent result can also be obtained with the embodiment of FIG. 8, wherein the situation of lower heat extraction with consequent local temperature rise in the adjacent fuel cells is obtained by varying the mutual distance between the different linear sections: in the illustrated case the higher spacing of the linear sections in the region next to the outlet determines a lower linear velocity with decrease in the thermal exchange coefficient, to which corresponds a temperature increase in the same region of adjacent fuel cells.

Figure 9:
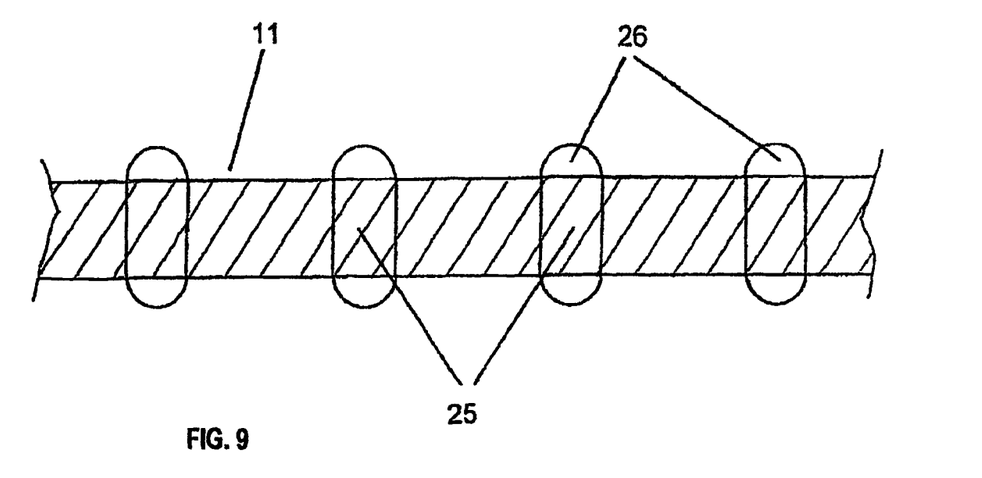
FIG. 9, section of the porous planar element of FIG. 5 along the line A-A in the case where the linear guiding sections are made of impervious resilient material.

FIG. 9 represents a side-view of the planar element of the invention of FIG. 5 according to the line A-A: the reference numerals (25) and (26) indicate respectively the body of the linear sections (23) and the relevant projecting parts from to the two surfaces of the porous planar element (11). This embodiment of linear sections requires the material of the sections to be resilient besides being impervious: in such a case, during the fuel cell assembly the projecting part (26) is compressed and undergoes a deformation inside the porous bulk of the planar element which ends bearing the majority of the compression load. In practice, the linear sections hence guarantee the sealing against the walls of the cooling devices with their deformation, allowing to guide the coolant flow in a predefined fashion along those predetermined paths ensuring the expected cooling extent and distribution.

The application of the linear sections may be effected in a simple way by employing a liquid consisting of a suitable monomer, or co-monomer mixture, or of an oligomer applied through an injector under appropriate pressure so as to achieve its complete penetration within the porous bulk of the element in form of segments whose apexes come out from at least one of the surfaces of the planar element. The application, as it can be easily inferred, can be entirely automated in order to achieve a sufficient dimensional reproducibility of the segments at a suitable rate for mass production. The segments inserted as mentioned into the planar elements are then polymerised with formation of the desired impervious and resilient material either by means of chemical initiators premixed with the liquid applied by the injectors, or under the action of the atmospheric oxygen, or finally by irradiation with a suitable radiation source as known in the art, the preferred method depending on the type of liquid applied. One example of particularly suitable liquid is represented by silicone-type products, which present the required resiliency upon completing the polymerisation.

Figure 10:
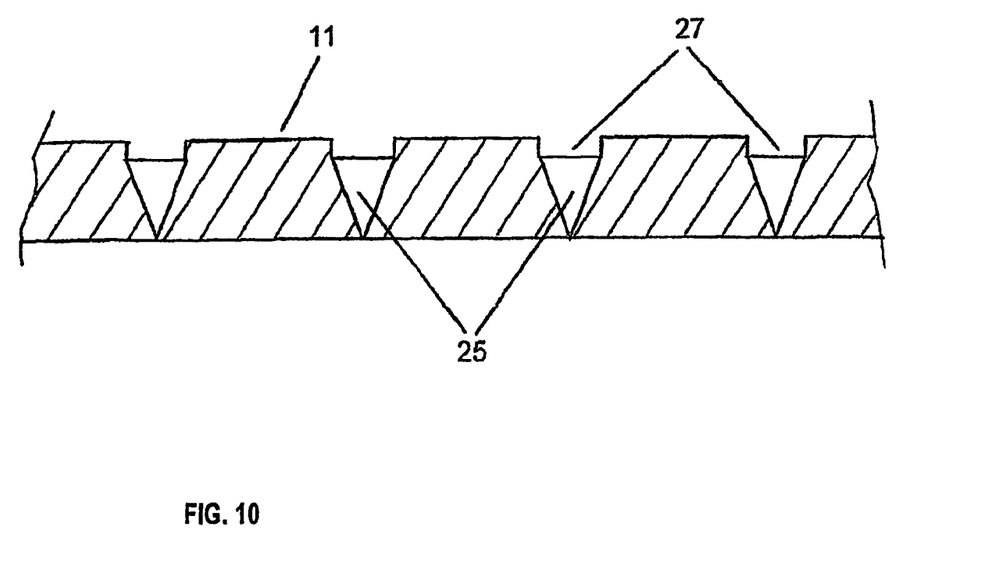
FIG. 10, section of the porous planar element of FIG. 5 along the line A-A in the case where the linear guiding sections are made of impervious stiff material.

The linear sections may also be formed with impervious and stiff material: in this case preformed linear sections are used, which are then embedded into the planar elements by compression. It is necessary that the preformed stiff sections penetrate completely within the planar element so that the latter can be deformed during the assembly under the effect of the compression load properly adapting to the walls of the cooling devices: in other words it is important that the compression load during the assembly phase is not exerted on the linear sections. This particular structure of planar element is shown in FIG. 10, wherein the reference numerals (25) and (27) respectively identify the preformed sections embedded in the planar element (11) and the portion of planar element available for the necessary deformation during the stack assembly.

Figure 11:
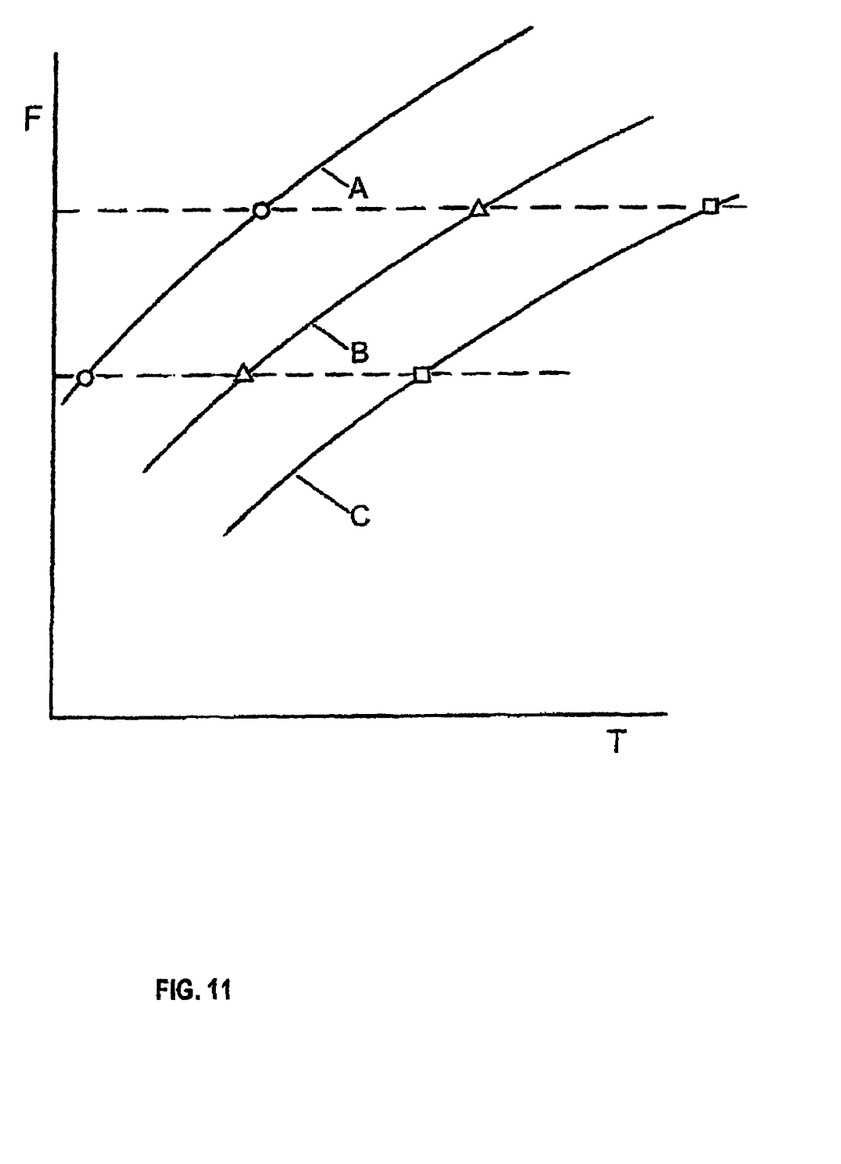
FIG. 11, qualitative trend of the internal temperature of a fuel cell provided with a cooling device comprising a porous planar element as known in the art (A, C) or a porous planar element provided with the linear guiding sections in accordance with the invention (B).

FIG. 11 qualitatively reproduces the results of a study on temperature distribution in fuel cells carried out on the basis of an appropriate mathematical model: the results are presented on a diagram with the cooling water flows F on the ordinate axis and the cell internal temperature T on the abscissa axis. Curves A and C represent the relationship between the internal temperature of a fuel cell equipped with the cooling device according to the prior art of FIG. 3 and the overall coolant flow which has been assumed as variable within the range delimited by the dashed lines: in particular curve A refers to the region of higher cooling water flow and curve C to the lower flow or stagnant region indicated as (22) in FIG. 3. As can be noticed, the Internal temperature of the fuel cell ranges from very low minimum values (curve A), which can induce undesired water condensation from the moist reactant air, to very high maximum values (curve C) corresponding to a possible membrane dehydration. Curve B reports the temperature of the same fuel cell, save for being equipped with the cooling device according to the invention as shown in FIG. 4: the internal temperature which ranges advantageously in-between the two above limit values allows to operate the cell in conditions of high reliability associated to lack of moisture condensation taking advantage at the same time of a trouble-free preservation of membrane hydration.

The previous description is not intended to limit the invention, which can be practised according to different embodiments without departing from the scopes thereof, and whose extent is univocally defined by the appended claims.

In the description and claims of the present application, the word "comprise" and its variations such as "comprising" and "comprises" are not intended to exclude the presence of other elements or additional components.

The invention claimed is:

1. A cooling device for a membrane fuel cell comprising a fuel feed, a fuel discharge, an air feed, and an air discharge, the cooling device comprising a porous planar conductive element interposed between two bipolar plates delimiting the cooling device, at least one coolant inlet, and at least one coolant outlet, wherein said porous planar conductive element comprises sections of polymeric impervious material, wherein said bipolar plates and said polymeric impervious material form a predetermined path for a coolant flow, and
   wherein the predetermined path for coolant flow is delimited by elements consisting essentially of said sections of polymeric impervious material and said bipolar plates.

2. The cooling device of claim 1 wherein said sections of polymeric impervious material are linear.

3. The cooling device of claim 2 wherein said linear sections of polymeric impervious material are parallel straight sections.

4. The cooling device of claim 2 wherein said linear sections of polymeric impervious material are distributed along part of the surface of the planar element.

5. The cooling device of claim 2 wherein said linear sections are distributed along the entire surface of the planar element.

6. The cooling device of claim 5 wherein spacing between said linear sections of polymeric impervious material is variable along said surface of the planar element.

7. The cooling device of claim 6 wherein said spacing is greater in correspondence of the fuel cell air discharge.

8. The cooling device of claim 2 wherein a portion of the planar element surface is free of said linear sections of polymeric impervious material.

9. The cooling device of claim 8 wherein said portion is not accessible to the coolant.

10. The cooling device of claim 8 wherein said portion is located in correspondence of the air discharge of the fuel cell.

11. The cooling device of claim 1 wherein said polymeric impervious material is resilient.

12. The cooling device of claim 11 wherein said sections of polymeric impervious material have projecting parts with respect to at least one surface of the planar element.

13. The cooling device of claim 1 wherein said polymeric impervious material is stiff.

14. The cooling device of claim 13 wherein said sections of polymeric impervious material have a lesser thickness than the planar element and are completely embedded therein.

15. A method for the production of the cooling device of claim 11 comprising
    applying a precursor liquid under pressure through an injector,
    infiltrating the precursor liquid within a thickness of the planar element forming segments of a projecting part of the precursor liquid from at least one of a main surface of the planar element,
    polymerizing said segments by means of either a chemical initiator, or of atmospheric oxygen or of irradiation with a suitable radiation source forming said polymeric impervious and resilient material.

16. The method of claim 15 wherein said precursor liquid comprises a monomer or a co-monomer mixture or an oligomer.

17. A method for the production of the cooling device of claim 13 comprising
    preforming said linear sections of stiff polymeric impervious material and
    applying said preformed sections to the planar element by compression with complete penetration into a thickness of the planar element.

* * * * *